United States Patent [19]

Hermann

[11] 4,208,930
[45] Jun. 24, 1980

[54] SPINDLE CONTROL MECHANISM

[75] Inventor: Otto Hermann, Cincinnati, Ohio

[73] Assignee: LeBlond Incorporated, Cincinnati, Ohio

[21] Appl. No.: 876,468

[22] Filed: Feb. 9, 1978

[51] Int. Cl.² .................... B23B 19/00; B23B 25/06
[52] U.S. Cl. .................... 82/28 A; 82/21 B; 82/29 R; 74/476; 74/479; 74/491; 74/527; 74/DIG. 2
[58] Field of Search .............. 82/28 R, 28 A, 29 R, 82/22, 21 B; 74/479, 527, 476, 491, DIG. 2; 318/543

[56] References Cited

U.S. PATENT DOCUMENTS

| | | | |
|---|---|---|---|
| 1,250,565 | 12/1917 | Crain | 82/29 R |
| 2,154,605 | 4/1939 | Carter | 82/29 R |
| 2,522,779 | 9/1950 | Culkosky | 74/527 |
| 2,608,109 | 8/1952 | Hoelscher | 82/21 B |

Primary Examiner—Leonidas Vlachos
Attorney, Agent, or Firm—Wood, Herron & Evans

[57] ABSTRACT

An improved spindle control mechanism for a lathe that includes, in preferred form, a rotatable control knob operably related to a plurality of spindle motor control and servo-control switches by a switch drum fixed thereto and operably connected to a spindle transmission through a control shaft by a connector link pivoted in an eccentric position at one end to the control knob and pivoted at the other end to a lever arm fixed to the control shaft. Rotation of the control knob into a forward position simultaneously translates the lathe's transmission into a forward spindle rotation position and starts the spindle drive motor. Rotation of the control knob into an intermediate stop position simultaneously stops the spindle drive motor and activates the spindle servo-control switch (which permits the spindle's rotation speed to be changed by a separate spindle servo-control mechanism, if desired). Rotation of the control knob into a reverse position simultaneously translates the transmission into a reserve spindle rotation position and starts the spindle drive motor.

16 Claims, 6 Drawing Figures

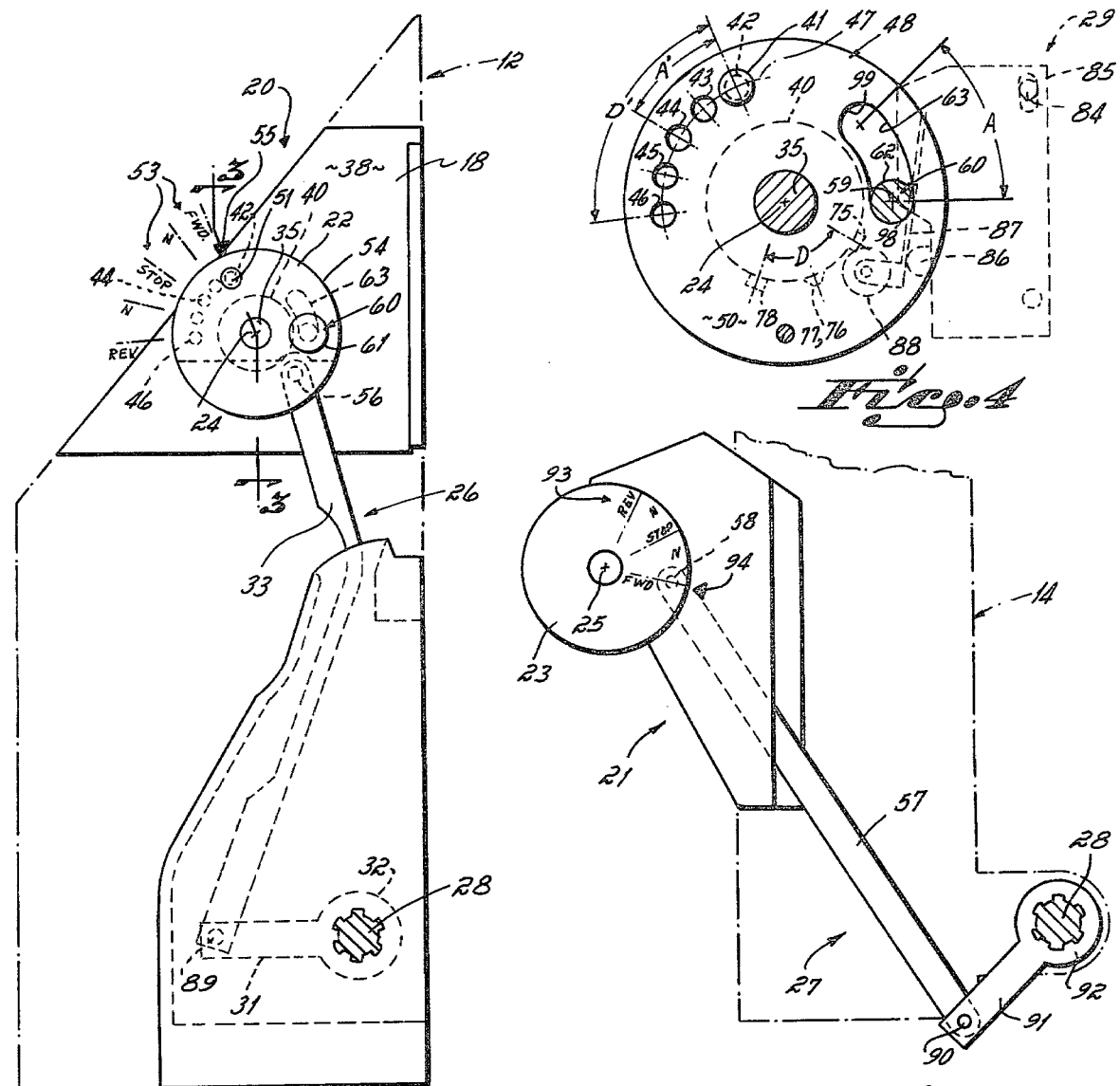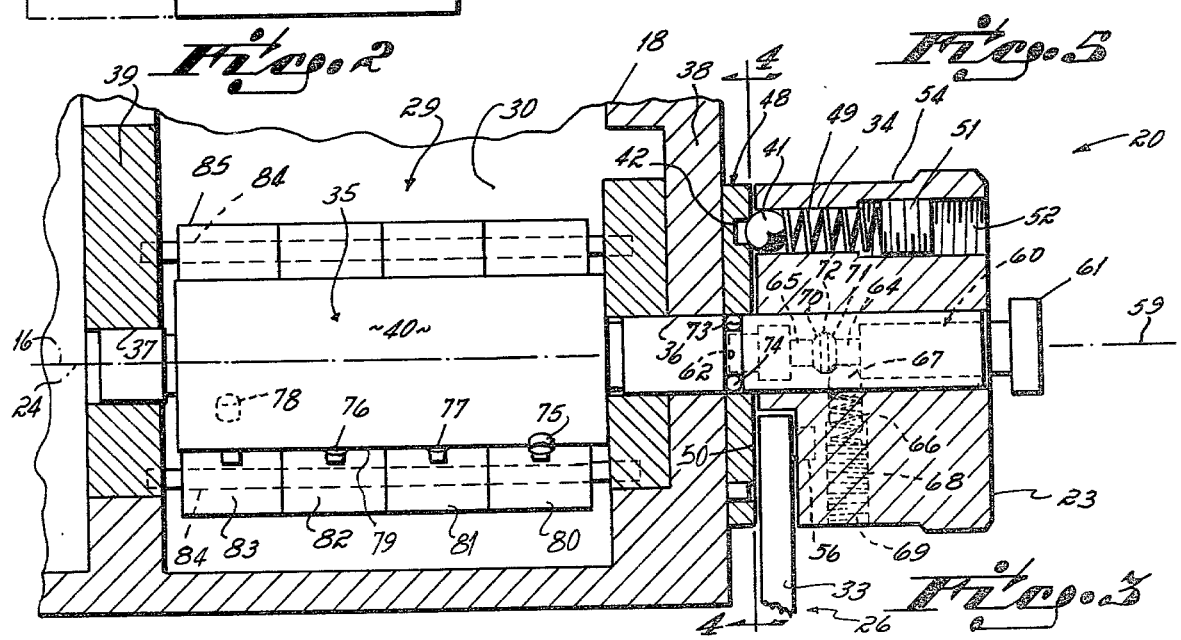

SPINDLE CONTROL MECHANISM

This invention relates to lathes. More particularly, this invention relates to an improved spindle control mechanism for a lathe.

Spindle control mechanisms for lathes are, of course, very well known to the prior art. The spindle control mechansim, as known to the prior art, basically controls two functions of the lathe. First, the spindle control mechanism controls the rotational direction of the lathe's spindle, i.e., clockwise or counterclockwise. Second, the spindle control mechanism controls the onoff operation of the spindle's drive motor, the motor of course being "on" to rotate the spindle and being "off" to stop spindle rotation.

The spindle control mechanism of this invention is an improvement, from a safety standpoint, over one particular spindle control mechanism known to the prior art for manually controlled lathes. In that prior art spindle control mechanism, two levers are provided adjacent the front longitudinal face of the lathe, one lever being mounted on the lathe's headstock and the other lever being mounted on the lathe's carriage (the carriage being longitudinally movable between the lathe's headstock and tailstock). Both these levers extend forwardly from the front face of the machine for manual control by the lathe's operator. And both the levers are mechanically interconnected by a control shaft. When either lever is pushed upwardly into a first position, the lathe's spindle rotates, e.g., clockwise, and when either lever is pushed downwardly into a second position, the spindle rotates, e.g., counterclockwise.

But these forwardly extending manual control levers are subject to being accidentally bumped or kicked by a passerby, or by the lathe's operator himself. If such an accidental striking occurs, rotation of the lathe's spindle and, therefore, rotation of the workpiece on the spindle may be inadvertently started. If this situation happens while the lathe's operator is setting up a workpiece or replacing the tool on the lathe's carriage, or is unprepared for spindle rotation for any other reason, the operator may be injured or the equipment itself may be damaged.

It has, therefore, been one objective of this invention to provide a novel spindle control mechanism for a manually controlled lathe that includes a rotatable control knob structure in place of the heretofore known lever control structure.

It has been another objective of this invention to provide an improved spindle control mechanism for a lathe that incorporates a rotatable control knob which, upon manual rotation into a forward position or into a reverse position, cooperates with a connector linkage structure for changing the lathe's spindle rotation between clockwise and counterclockwise directions as desired.

It has been still another objective of this invention to provide an improved spindle control mechanism for a lathe that includes a manually rotatable control knob which, through a switch control drum fixed thereto, directly operates at least one of a motor control switch for the spindle's drive motor and a speed control switch for the lathe's spindle servo-control mechanism.

In accord with these objectives, and in preferred form, the improved spindle control mechanism of this invention includes a manually rotatable primary control knob on the lathe's headstock that is operably related to a plurality of spindle motor control and servo-control switches by a switch drum fixed thereto, and is operably connected to a spindle transmission through a control shaft by a primary connector link pivoted in an eccentric position at one end to the control knob and pivoted at the other end to a primary lever arm fixed to the control shaft. Rotation of the primary control knob into a forward position simultaneously translates the lathe's transmission into a forward spindle rotation position and starts the spindle drive motor. Rotation of the primary control knob into an intermediate stop position simultaneously stops the spindle drive motor and activates the servo-control switch (which permits the rotation speed of the spindle to be changed by a separate servo-control mechanism, if desired). Rotation of the primary control knob into a reverse position lsimultaneously translates the transmission into a reverse spindle rotation position and starts the spindle drive motor. A manually rotatable secondary control knob is mounted on the lathe's carriage and is connected with the control shaft by a secondary connector link in the same fashion as the primary connector link. The secondary control knob does not include a switch control drum, but is operationally connected to the spindle motor control and servo-control switches through the control shaft and the primary control knob. Here, rotation of the secondary control knob achieves the same results as rotation of the primary control knob.

Other objectives and advantages of this invention will be more apparent from the following detailed description, taken in conjunction with the drawings in which:

FIG. 2 is a cross-sectional view taken along line 2—2 of FIG. 1;

FIG. 3 is a cross-sectional view taken along line 3—3 of FIG. 2;

FIG. 4 is a cross-sectional view taken along line 4—4 of FIG. 3;

FIG. 5 is a cross-sectional view taken along line 5—5 of FIG. 1; and

Figure 1:
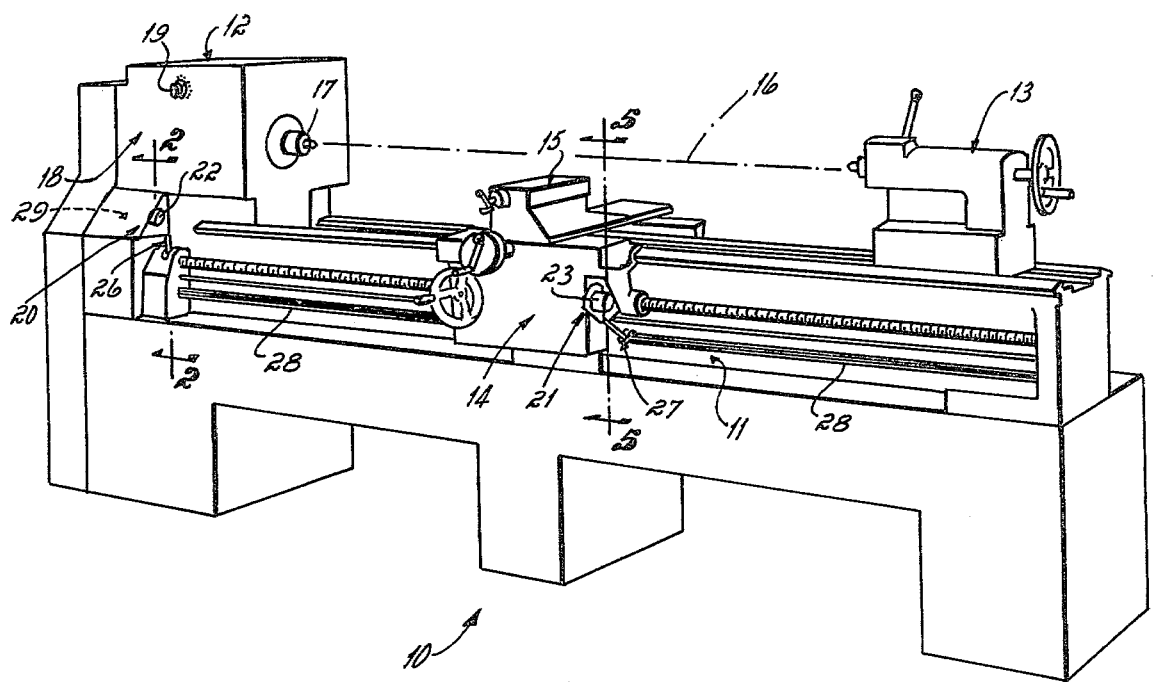
FIG. 1 is a perspective view illustrating a manually controlled lathe that incorporates the improved spindle control mechanism of this invention.

The improved spindle control mechanism of this invention is illustrated in combination with a manually controlled lathe 10, as shown in FIG. 1. The lathe 10 includes a bed 11, a headstock 12 and a tailstock 13. The bed 11 supports a longitudinally movable carriage 14 which, in turn, supports a transversely movable saddle 15 relative to the longitudinal axis 16 of the lathe. The saddle 14 carries a cutting tool (not shown) for performing cutting operations on a workpiece (not shown) supported between the tailstock 13 and a spindle 17 on the headstock 12. The headstock 12 includes a housing 18 within which is located a transmission (not shown in detail) for controlling the forward (e.g., clockwise) or reverse (e.g., counterclockwise) rotational direction of the spindle 17. The housing 18 also includes a servo-control mechanism (not shown in detail) for controlling the particular rotational speed of the spindle 17, e.g., 100 rpm, 200 rpm or the like. The particular speed at which the spindle 17 is rotated is determined by the setting of, for example, a control knob 19 carried by the headstock 12. Further, a drive motor (not shown in detail) provides the power to rotate the spindle 17 in the first instance. The drive motor, transmission, and servo-control mechanism are all well known to the prior art for manually controlled lathes.

Figure 6:
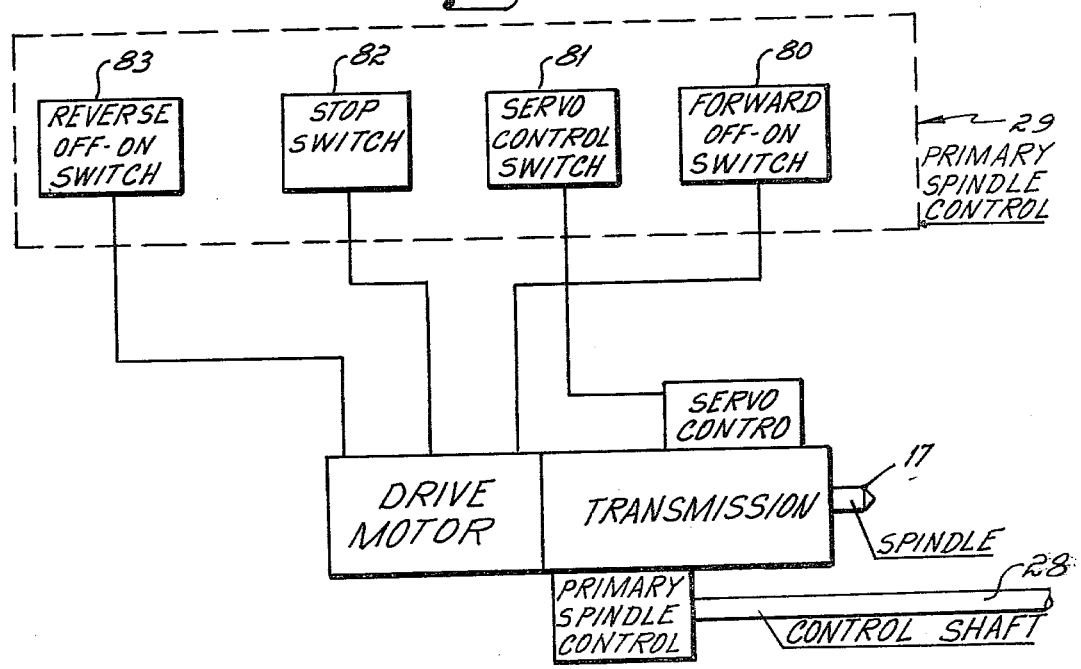
FIG. 6 is a block diagram illustrating the electrical and mechanical interconnection of the improved spindle control mechanism with the lathe's spindle.

The improved spindle control mechanism of this invention includes primary 20 and secondary 21 control locations. The primary control location 20, as illustrated in FIG. 1, is located on the lathe's headstock 12, and the secondary control location 21 is located on the lathe's longitudinally movable carriage 14. Each control location 20, 21 includes a control knob 22, 23, respectively, that is rotational relative to a center axis 24, 25, respectively, those center axes being disposed parallel to the front face and longitudinal axis 16 of the lathe. Both control knobs 22, 23 are connected, by means of a connector linkage structure 26, 27, respectively, with a control shaft 28, the control shaft being connected with spindle transmission, see FIG. 6. Only the primary control knob 22, however, is connected with a switching structure 29 that controls the on/off attitude of the spindle's drive motor, and that is electrically connected with the spindle's adjustable speed servo-control mechanism for permitting change of spindle rotation speed when desired, see FIG. 6. The secondary control knob 23 is not directly connected with that switching structure 29, but is indirectly connected with it through control shaft 28 as described in greater detail below.

The primary control location 20, as previously mentioned, includes primary control knob 22 and is particularly illustrated in FIGS. 2–4. The primary knob 22 is rotationally mounted on axis 24 to primary control housing 29. More particularly, the primary control knob 22 is immobilily fixed on a shaft 35 carried in bearing bores 36 and 37 of support walls 38, 39 which are part of or fixed to the headstock housing 18, see FIG. 3. The primary knob 22 is mounted on that portion of the shaft which extends exteriorly of the housing 29, and a switch control drum 40 is immobilily fixed on that portion of the shaft disposed interiorly of the housing. The primary control knob 22 carries a first portion of a temporary latch that includes a first detent ball 41 in bore 34 spaced from but disposed parllel to the knob's rotational axis 24. That first detent ball 41 is adpated to cooperate with a second portion of a temporary latch that includes a plurality of positioning seats 42–46 disposed in arcuate configuration 47 adjacent the periphery of a positioner plate 48, see FIG. 2. The positioner plate 48 is immobilily fixed to the head stock housing's wall 38, and the seats' arc 47 has a centerpoint that lies on the knob's rotational axis 24. The first detent ball 41 is spring 49 loaded against the outer surface 50 of that positioner plate 48, the spring 49 being maintained in compression by set screw 51 threaded into counterbore 52 of the primary control knob 22. Thus, and as the primary control knob 22 is rotated relative to axis 24 (and, therefore, relative to the positioner plate 48), the first ball 41 is carried, e.g., from one seat 42 to another 43, in that positioner plate, the knob's detent ball and the positioner plate's seats 42–46 cooperating to maintain the primary control knob in that position 42–46 selected by the lathe's operator. The positioner plate's seats 42–46 correspond with forward, neutral, stop, neutral and reverse rotational positions for the primary control knob 22 as described in more specific detail below. The forward, neutral, stop, neutral and reverse legends 53 are visibly denoted on the knob's exterior peripheral surface 54, and these legends 53 cooperate with an immobile benchmark 55 positioned on the housing 18.

The primary control knob 22 also includes a selectively operable limit pin 60 that limits rotational motion of the control knob when the limit pin is operationally engaged with the positioner plate 48, see FIGS. 3 and 4. The limit pin's axis 59 is disposed parallel to the rotational axis 24 of the knob 22, but is spaced outwardly therefrom adjacent the outer periphery of the knob, as particularly illustrated in FIG. 4. The limit pin 60, as illustrated in FIG. 3, includes an outer or knob end 61 and a working or butt end 62 adapted to ride in arcuate limit slot 63 defined in the positioner plate 48, see FIGS. 3 and 4. The arc of the arcuate limit slot 63 has a centerpoint that lies on the knob's rotational axis 24. The limit pin 60, intermediate the ends 61, 62 thereof, includes an engagement recess 64 and a nonengagement recess 65 circumferentially defined in the pin and spaced one from another. These recesses 64, 65 are adapted to cooperate with a second spring 66 loaded detent ball 67, the ball 67 cooperating with either recess 64 or 65 to retain the limit pin 60 in the engaged position or non-engaged position, as desired by the lathe's operator, relative to the limit slot 63 in the positioner plate 48. The spring 66 of the second detent ball 67 is retained in the compressive attitude by set screw 68, the bore 69 within which the compression spring and ball are disposed being radially oriented within the knob 22 relative to the axis 24. The operative or engaging position of the limit pin 60 with the positioner plate's limit slot 63 is illustrated in FIG. 3. The non-engaging or inoperative position of the limit pin 60 would be established if that limit pin were pulled away for the knob 20 so that second detent ball 67 rested in recess 65 defined by the pin's shaft, thereby removing the pin's butt end 62 from engaging relation with the positioner plate's limit slot 63. The pin 60 is movable between operative and inoperative positions as cam surfaces 70, 71 on the rib 72 separating those two recessed areas cooperate to permit the ball 67 to be moved therebetween against the bias of compression spring 66 in response to axial or longitudinal motion of the pin 60.

When the pin 60 is engaged with the positioner plate's limit slot 63, i.e., when the pin is in the operative position as shown in FIGS. 3 and 4, the limit pin functions to limit the rotational movement of the control knob 22 between the forward position 42 as shown in FIGS. 2–4, and the stop position 44, (not shown) since the length A of the arc defined by that limit slot is equal to the length A' of the arc defined between the forward positioning seat 42 and the stop positioning seat 44 for the primary control knob. When the pin 60 is not engaged with the positioner plate's limit slot 63, i.e., when the pin is in the inoperative position (not shown), the primary control knob 22 is free to rotate between the forward position 42 and the reverse position 46 as desired.

The primary control knob 22, as mentioned earlier, is also directly connected with switch apparatus 29 that controls the on/off attitude of the spindle drive motor, as well as controls the operability of the spindle speed servo-control mechanism, see FIGS. 3 and 4. An O-ring 74 is received in annular groove 73 around the primary control knob's shaft 35 where that shaft enters the primary control housing 29 through positioner plate 48, thereby closing off the switch chamber 30 mounted to the headstock housing to atmosphere and, hence, to cutting fluids that may be employed during use of the lathe. The shaft 35 that mounts the primary control knob 22, as illustrated in FIG. 3, also mounts the switch control drum 40. The switch control drum 40 carries a forward finger 75, a stop finger 76, a servo-control finger 77 and a reverse finger 78 extending from the surface 79 thereof, spaced one from another along the axial length of that switch control drum, and spaced one from another peripherally around that conrol drum. Each of these fingers 75–78 is adapted to cooperate with a switch forward motor control switch 80, a servo-control switch 81, a stop motor control switch 82 and a reverse motor control switch 83, the switches 80–83 being mounted adjacent one to another in fixed or immobile relation within the headstock housing 12. The mounting structure for the switches 80–83 includes two pins 84 through a round and an oblong hole in each of the switches' housings 85, those pins being immobilily connected to walls 38, 39 at opposed ends, see FIG. 4. Each switch 80–83 includes a control button 86 for contact with a pivot arm 87, the pivot arm carrying an idler roller 88 on the free end that is contacted by the related control drum finger 75, 76, 77 or 78. As illustrated particularly in FIG. 4, note that the control drum's forward 75 and reverse 78 actuator fingers are spaced one from another on the drum's peripheral surface an arcuate distance D equal to the arcuate distance D' between the forward 42 and reverse 46 seat on the positioner plate 48. Note also that the servo-control 77 and stop 76 actuator fingers are in line one with another on the drum's peripheral surface and are located between the forward 75 and reverse 78 fingers on that control drum 40 surface, thereby simultaneously activating the drive motor stop switch 82 and the servo-control switch 81 when the primary control knob's detent ball 41 is disposed in the positioner plate's stop seat 44 of the positioner plate. The central drum's servo-control 77 and stop 76 fingers are located midway between the forward 75 and reverse 78 fingers on the drum's surface when viewed axially, as shown in FIG. 4.

The primary control knob 22 is also connected to a splined control shaft 28 (and, thereby, to the spindle's transmission) through primary connector linkage structure 26 as previously mentioned, see FIG. 2. The linkage structure 27 includes a primary connector lever 31 which, through collar 32, is fixed to and extends radially from the control shaft 28. The linkage structure 27 also includes a primary connector link 33 pivotally connected at one end by pin 56 to the primary control knob 22, see FIGS. 2 and 3, and pivotally connected at the other end by pin 89 to the free end of connector lever 31. Note the pivot pin 56 connection of the connector link 33 to the control knob 22 is eccentric to the rotational axis 24 of that knob. As viewed in FIG. 2, it can be seen that rotation of the primary control knob 22 causes rotation of the control shaft 28 between a forward position through a stop position to a reverse position through the connector linkage structure 26 comprised of connector link 33 and connector lever 31.

The secondary control knob 23 is particularly illustrated in FIG. 5. The secondary control knob 23 is connected by secondary connector linkage structure 27 to the splined control shaft 28 (which shaft 28 is oriented parallel to the lathe's axis 16). The secondary connector linkage structure includes a secondary control knob 23 at one end and pivotally mounted as by pin 90 to the free end of a secondary connector lever 91 on the control shaft 28. Note the pivot pin 58 connection of the connector link 57 to the control knob 23 mounted through collar 92 is eccentric to the rotational axis 25 of that knob. Note also the connector lever's splined collar 92 permits that lever to slide or move axially of longitudinally of the control shaft 28 (as the lathe's carriage 14 is so moved, but prevents rotation of the lever 91 relative to the control shaft 28. The secondary control knob 23 also carries the forward, neutral, stop, neutral, forward legends 93 visibly thereon, which legends are positioned to cooperate with an immobile benchmark 94 on the carriage 14 for locating the secondary control knob 23 in the desired position. The secondary control knob 23 does not cooperte directly with the switching apparatus 29 that is directly connected with the primary control knob 22 as shown in FIG. 3. The secondary control knob 23 is, however, indirectly connected with the switching apparatus 29 back through the secondary connector linkage 27, control shaft 28 and primary connector linkage 26. Hence, rotation of the secondary control knob 23 from, for example, the forward to the stop attitude or vice versa causes an identical rotation in the primary control knob 22 and, hence, indirectly operates switching apparatus 29. Further, such rotation of secondary control knob 23 locates the primary control knob's detent ball 41 in the appropriate seat 42–46 of positioner plate 48, the primary control knob latch structure 41–46 thereby restraining both the secondary 23 and primary 22 control knobs in the selected rotational position.

Use of the primary control knob 22 is shown in FIGS. 2–4. When the primary control knob 22 is in the forward position (as shown in FIGS. 2–4), the primary connector link 33 cooperates with the primary lever 31 to rotate the control shaft 28 into a first operative or forward position, as illustrated, and that forward position of the control shaft translates the spindle 17 transmission into a forward operational position so that the spindle rotates in a forward (e.g., clockwise) direction. The primary control knob 22 is positively located in the forward position when the limit pin 60 is operationally engaged with the positioner plate's limit slot 63 through cooperation of the pin's butt end 62 with the slot's forward end 98, as particularly shown in FIGS. 3 and 4. The primary 22 control knob is restrained in the forward position because spring 49 biased ball 41 detent is seated in the positioner plate's forward seat 42. Also, and when the primary control knob 22 is in the forward position, forward finger 75 on the switch control drum 40 turns on the spindle drive motor by activating off/on motor switch 80, thereby causing forward rotation of the spindle 17.

When the primary control knob 22 is moved to a first neutral position as established through cooperation of the master control knob's spring biased ball 41 detent with neutral seat 43 on the positioner plate 48 (which neutral seat 43 is positioned between the forward 42 and stop 44 seats on that positioner plate), the connector link 33 cooperates with the control shaft 28 to rotate that shaft into a neutral position where the transmission disengages the spindle 17 from driving interconnection with the drive motor. In this neutral position, the spindle 17 is free to be manually rotated if desired for repositioning of the workpiece relative to the lathe's cutting tool (not shown) while the drive motor remains on.

When the primary control knob 22 is rotated about axis 24 into the second operative or stop position (which position is established by spring loaded ball detent 41 interengaging stop seat 44 on the positioner plate 48), the limit pin's butt end 62 cooperates with the limit slot's stop end 99 to locate positively the control knob in that position. In the stop 44 attitude, the knob 22 locates the primary connector link 33 and, hence, the control shaft 28 in the stop attitude so that the transmission is in neutral and locates the control drum 40 so that stop finger 76 activates the stop switch 82, thereby turning off the spindle 17 drive motor. Also, and when the primary control knob 22 is in the stop attitude, the servo-control mechanism switch 81 is activated. Activation of this switch 81 permits the speed change or servo-control mechanism to function so as to change the rotation speed of the spindle 17 from a high speed to a low speed or vice versa. The servo-control switch 81 is, therefore, in the nature of a safety switch that prevents operation of the speed change mechanism by which the rotational speed of the spindle 17 is varied until the control knobs 22, 23 are in the stop attitude (at which position the spindle's drive motor is turned off). In normal operation, the forward 42 and stop 44 positions are the most common positions of the primary control knob 22 (as well as, of course, of the secondary control knob 23) because the spindle 17 is normally rotated in only a single direction except in the case of unusual workpiece-forming circumstances. Thus, and normally, the limit pin 60 is maintained in the positioner plate 148 engaging or operative position illustrated in FIGS. 3 and 4 so that the lathe operator does not inadvertently bypass the stop 44 position to the reverse position 46, and so that the forward 42 and stop 44 positions for the control knobs 22, 23 are firmly defined.

When it is desired to reverse the rotational direction of the spindle 17 (to, e.g., a counterclockwise direction) the limit pin 60 is first pulled outwardly from that attitude illustrated in FIG. 3 into that attitude where the spring biased second ball 67 is received in the pin's recess 65. The limit pin 60 is thereby restrained in that inoperative or disengaged attitude relative to the positioner plate 48 because the spring biased second ball 67 so holds it in the inoperative position (not shown). This permits the primary control knob 22 to rotate counterclockwise (as shown in the Figures) from the stop attitude past the second neutral 45 position into the third operative reverse position 46. In the reverse position, the primary control knob's detent ball 41 cooperates with reverse seat 46 in the positioner plate 48, thereby maintaining the primary control knob 22 in the reverse attitude. And when the primary control knob 22 is in the reverse position 46, the spindle's drive motor is activated because switch control drum's reverse finger 78 has activated reverse motor switch 83 to turn that drive motor on. Further, and in that reverse attitude 46, the primary connector link 33 has been repositioned so that the control shaft 28 has been rotated into a reverse position. In this reverse position of the control shaft 28, the transmission has been changed so that spindle 17 rotates in a reverse direction. Such a reverse direction rotation of the spindle 17 may be desirable when, for example, chasing threads on a shaft workpiece if the lathe is being used to form threads on that workpiece.

When the primary control knob 22 is rotated back from the reverse 46 position toward the stop 44 position, or vice versa, it may be permitted to stop in a neutral 45 position which is similar to the neutral 43 position established between the forward 42 and stop 44 positions of the control knob. In this second neutral 45 position, and as in the first neutral 43 position, the spindle's drive motor is disengaged from driving relation with the spindle through the transmission, but the spindle 17 is free to be manually turned. Once reverse rotation of the spindle 17 is no longer desired, and after the primary control knob 22 has been re-established in the stop 44 position, the limit pin 60 may be pushed inward so that the limit pin's butt end 62 once again operationally engages the positioner plate's limit slot 63 in that attitude illustrated in FIG. 3.

The secondary control knob 23 functions in the same manner as does the primary control knob 22 in that it, also, operates the spindle's transmission between forward, neutral and reverse positions through rotation of that secondary control knob. Further, the forward, neutral, stop, neutral, reverse positions of the secondary control knob 23 are established by virtue of the fact that the rotational motion of the secondary control knob is translated back to the primary control knob's latch structure 41-46 through the control shaft 28. Further, and in order to rotate the secondary control knob 23 from the stop 44 through the neutral 45 to the reverse 46 and back through the neutral to the stop positions, the limit pin 60 on the primary control knob 22 must be pulled out as previously described.

Having described in detail the preferred embodiment of my invention, what I desire to claim and protect by Letters Patent is:

1. An improved spindle control mechanism for a spindle of a lathe, said mechanism comprising
    a manually rotatable primary control knob, said primary control knob being connected to said lathe, and said primary control knob being rotatable between first, second and third operative positions,
    connector means connecting said primary control knob to said lathe's spindle for controlling the rotation attitude of said spindle, the rotation attitude of said spindle being dependent on the operative position of said primary control knob, and
    rotation limit structure connected with said primary control knob for selectively defining the rotation limits of said primary knob as desired by the lathe's operator, when said rotation limit structure is engaged said rotation limit structure being operable to allow rotation of said control knob between first and second operative positions and to deny rotation of said control knob between first and third operative positions, and when said rotation limit structure is disengaged said rotation limit structure being operable to allow rotation of said control knob between first and third operative positions.

2. An improved spindle control mechanism as set forth in claim 1, said rotation limit structure comprising
    a limit pin movable between operative and inoperative positions, said limit pin being carried by one of said primary control knobs and that part of said lathe to which said primary control knob is connected, and
    structure defining a limit slot in the other of said lathe part and said primary control knob, said limit pin cooperating with said limit slot to limit rotation of said control knob between first and second positions when said limit pin is operatively engaged with said limit slot.

3. An improved spindle control mechanism as set forth in claim 2, said rotation limit structure further comprising
    a spring loaded latch adapted to restrain said limit pin in at least one of said operative and inoperative positions.

4. An improved spindle control mechanism set forth in claim 1, said lathe having a transmission, and said connector means comprising a control shaft connected with the transmission of said lathe for controlling the rotation attitude of said spindle, a connector lever connected to said control shaft, and a connector link pivotally connected to said connector lever at one end and pivotally connected to said primary control knob at the other end, said connector link's pivotal connection with said primary control knob being located at a position eccentric to the rotational axis of said primary control knob.

5. An improved spindle control mechanism as set forth in claim 1, said mechanism further comprising a temporary latch connected with said primary control knob for retaining said control knob in the operative position selected, said temporary latch comprising a spring loaded latch element mounted in one of said primary control knob and that part of said lathe to which said primary control knob is connected, land a plurality of position seats formed in the other of said lathe part and said primary control knob, said spring loaded latch element being seated in one of said position seats to locate said control knob in the desired operative position.

6. An improved spindle control mechanism as set forth in claim 1, said lathe having a spindle drive motor, and said mechanism further comprising a switch control drum fixed to said primary control knob, said control drum having forward, stop and reverse control fingers extending therefrom, and said control drum rotating in response to the rotation of said control knob, and a forward switch, a stop switch and a reverse switch electrically connected with the drive motor for said lathe's spindle, said forward and reverse switches activating said spindle drive motor when said primary control knob is in forward and reverse operative positions, and said stop switch deactivating said drive motor when said primary control knob is in a stop operative position.

7. An improved spindle control mechanism for a lathe, said lathe having a headstock, a spindle, a drive motor and a transmission for said spindle, a tool carriage, and a tailstock, said mechanism comprising a manually rotatable primary control knob, and a manually rotatable secondary control knob, said primary knob being mounted on the headstock of said lathe and said secondary knob being mounted on the carriage of said lathe, a control shaft connected with the transmission of said lathe for controlling the rotation attitude of said spindle, said control shaft extending from the headstock end to the tailstock end of said lathe, a primary connector lever connected to said control shaft, and a primary connector link pivotally connected to said connector lever at one end and pivotally connected to said primary control knob at the other end, said primary connector link's pivotal connection with said primary control knob being located at a position eccentric to the rotational axis of said primary control knob, a secondary connector lever connected to said control shaft, said secondary connector lever being connected in a fashion that permits longitudinal motion of said lever along said control shaft but prevents rotational motion of said lever relative to said control shaft, and a secondary link pivotally connected at one end to said secondary control knob and pivotally connected at the other end to said secondary connector lever, said secondary connector link's pivotal connection with said secondary control knob being located at a position eccentric to the rotational axis of said secondary control knob, a switch control drum connected to one of said primary and secondary control knobs, said control drum having forward, stop, and reverse fingers extending therefrom, and said control drum being rotated in response to rotation of either one of said primary and secondary control knobs through the mechanical linkage connector therebetween established by said control shaft, primary and secondary connector links and primary and secondary connector levers, and a forward switch, a stop switch and a reverse switch electrically connected with a drive motor for said lathe's spindle, said forward and reverse switches activating said spindle drive motor when said control knobs are in forward and reverse operative positions, and said stop switch deactivating said drive motor when said control knobs are in a stop position.

8. An improved spindle control mechanism as set forth in claim 7, said primary control knob being rotationally mounted to said lathe's headstock, and said secondary control knob being rotationally mounted to said lathe's carriage.

9. An improved spindle control mechanism as set forth in claim 7, said mechanism further comprising a temporary latch connected with one of said control knobs for retaining said control knobs in the rotational position selected, said temporary latch element comprising a spring loaded llatch mounted in one of said control knob and that part of said lathe to which said control knob is connected, and a plurality of position seats formed in the other of said lathe part and said control knob, said spring loaded latch element being seated in one of said position seats to locate said control knob in the desired rotational position.

10. An improved spindle control mechanism as set forth in claim 7, said mechanism further comprising rotation limit structure connected with one of said control knobs for selectively defining the rotation limits of that knob as desired by the lathe's operator, when said rotation limit structure is engaged said rotation limit structure being operable to allow rotation of said control knobs between first and second operative positions and to deny rotation of said control knobs between first and third operative positions, and when said rotation structure is disengaged said rotation limit structure being operable to allow rotation of said control knobs between first and third operative positions.

11. An improved spindle control mechanism as set forth in claim 10, said rotation limit structure comprising a limit pin movable between operative and inoperative positions, said limit pin being carried by one of said control knobs and that part of said lathe to which that control knob is connected, and structure defining a limit slot in the other of said lathe apart and that one said control knob, said limit pin cooperating with said limit slot to limit rotation of said control knob between first and second positions when said limit pin is operatively engaged with said limit slot.

12. An improved spindle control mechanism as set forth in claim 11, said rotation limit structure further comprising
 a spring loaded latch adapted to restrain said limit pin in at least one of said operative and inoperative positions.

13. An improved spindle control mechanism for a spindle of a lathe, said mechanism comprising
 a manually rotatable primary control knob, said primary control knob being connected to said lathe,
 connector linkage connecting said primary control knob to a control shaft, said control shaft, and thereby said control knob, being connected with said lathe's spindle for controlling the rotational direction of said spindle, and
 rotation limit structure connected with said primary control knob, said rotation limit structure being selectively operable to limit rotation of said control knob between first and second positions when said rotation limit structure is engaged, said rotation limit structure comprising
  a limit pin axially movable between operative and inoperative positions, and said limit pin being carried by one of said primary control knob and that part of said lathe to which said primary control knob is connected, and
  a structure defining a limit slot in the other of said lathe part and said primary control knob, said limit pin limiting rotation of said control knob between first and second positions defined by said limit slot when said limit pin is operatively engaged with said limit slot.

14. An improved spindle control mechanism as set forth in claim 13, including
 a spring loaded ball latch adapted to restrain said limit pin in said operative and inoperative positions.

15. An improved spindle control mechanism for a spindle of a lathe, said mechanism comprising
 a manually rotatable primary control knob, said primary control knob being connected to said lathe,
 switching apparatus directly connected to said primary control knob, said switching apparatus operating in response to the rotational position of said control knob for stopping and starting rotation of said lathe's spindle, and
 rotation limit structure connected with said primary control knob, said rotation limit structure being selectively operable to limit rotation of said control knob between first and second positions when said rotation limit structure is engaged, said rotation limit structure comprising
  a limit pin axially movable between operative and inoperative positions, and said limit pin being carried by one of said primary control knob and that part of said lathe to which said primary control knob is connected, and
  a structure defining a limit slot in the other of said lathe part and said primary control knob, said limit pin limiting rotation of said control knob between first and second positions defined by said limit slot when said limit pin is operatively engaged with said limit slot.

16. An improved spindle control mechanism as set forth in claim 15, including
 a spring loaded ball latch adapted to restrain said limit pin in said operative and inoperative positions.

* * * * *

UNITED STATES PATENT AND TRADEMARK OFFICE
CERTIFICATE OF CORRECTION

PATENT NO. : 4,208,930
DATED : June 24, 1980
INVENTOR(S) : Otto Hermann

It is certified that error appears in the above-identified patent and that said Letters Patent are hereby corrected as shown below:

Column 2, line 16, "1simultaneously" should be -- simultaneously --

Column 6, line 1, "of" should be -- or --

Column 7, line 23, "148" should be -- 48 --

Column 7, line 41, after "operative" insert -- or --

Column 9, line 19, "land" should be -- and --

Column 10, line 34, "1latch" should be -- latch --

Signed and Sealed this

Thirtieth Day of September 1980

[SEAL]

Attest:

SIDNEY A. DIAMOND

Attesting Officer

Commissioner of Patents and Trademarks